(12) United States Patent
Schmitz

(10) Patent No.: US 10,581,112 B2
(45) Date of Patent: Mar. 3, 2020

(54) METHYLPHOSPHONOYLOXYMETHANE AS ELECTROLYTE COMPONENT

(71) Applicant: Gotion Inc., Fremont, CA (US)

(72) Inventor: Rene Schmitz, Stuttgart (DE)

(73) Assignee: Gotion Inc., Fremont, CA (US)

( * ) Notice: Subject to any disclaimer, the term of this patent is extended or adjusted under 35 U.S.C. 154(b) by 0 days.

(21) Appl. No.: 16/081,784

(22) PCT Filed: Feb. 21, 2017

(86) PCT No.: PCT/EP2017/053934
§ 371 (c)(1),
(2) Date: Aug. 31, 2018

(87) PCT Pub. No.: WO2017/148748
PCT Pub. Date: Sep. 8, 2017

(65) Prior Publication Data
US 2019/0067734 A1   Feb. 28, 2019

(30) Foreign Application Priority Data

Mar. 3, 2016 (EP) .................................. 16158528

(51) Int. Cl.
| | | |
|---|---|---|
| *H01M 10/00* | (2006.01) | |
| *H01M 10/0525* | (2010.01) | |
| *H01G 11/06* | (2013.01) | |
| *H01M 10/0567* | (2010.01) | |
| *H01M 10/0568* | (2010.01) | |
| *H01M 10/0569* | (2010.01) | |
| *H01G 11/64* | (2013.01) | |

(52) U.S. Cl.
CPC ........ *H01M 10/0525* (2013.01); *H01G 11/06* (2013.01); *H01G 11/64* (2013.01); *H01M 10/0567* (2013.01); *H01M 10/0568* (2013.01); *H01M 10/0569* (2013.01); *H01M 2300/0031* (2013.01); *H01M 2300/0034* (2013.01); *H01M 2300/0037* (2013.01); *Y02E 60/13* (2013.01)

(58) Field of Classification Search
None
See application file for complete search history.

(56) References Cited

U.S. PATENT DOCUMENTS

2015/0140444 A1* 5/2015 Dubois ................. H01M 4/505
429/331

FOREIGN PATENT DOCUMENTS

| | | |
|---|---|---|
| JP | H06196368 A | 7/1994 |
| JP | 2012146833 A | 8/2012 |
| WO | 2013180781 A1 | 12/2013 |

* cited by examiner

*Primary Examiner* — Jacob B Marks
(74) *Attorney, Agent, or Firm* — Young Basile Hanlon & MacFarlane, P.C.

(57) ABSTRACT

An electrolyte composition and an electrochemical cell that includes the electrolyte composition are included. The electrolyte composition includes: at least one aprotic organic solvent; at least one conducting salt; methylphosphonoyloxymethane; and optionally one or more additives. The use of methylphosphonoyloxymethane in an electrolyte composition for electrochemical cells is also included.

15 Claims, No Drawings

METHYLPHOSPHONOYLOXYMETHANE AS ELECTROLYTE COMPONENT

CROSS-REFERENCE TO RELATED APPLICATION(S)

This application is a 371 application of International Application No. PCT/EP2017/053934, filed on Feb. 21, 2017, which claims priority to European Patent Application No. 16158528.6, filed on Mar. 3, 2016, the content of which is hereby incorporated by reference in its entirety.

DETAILED DESCRIPTION

The present disclosure relates to the use of methylphosphonoyloxymethane in electrolyte composition, to electrolyte compositions containing methylphosphonoyloxymethane for electrochemical cells and to electrochemical cells comprising such electrolyte composition.

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 4 V) in comparison with other battery systems. For that reason, these systems have become widely used as a power source for many portable electronics such as cellular phones, laptop computers, mini-cameras, etc. They are also increasingly used as power supply in automobiles.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and film forming additives which react during first charge/discharge cycle on the electrode surface thereby forming a film on the electrode. The film protects the electrode from direct contact with the electrolyte composition. One well-known additive filmforming additive is vinylene carbonate.

Due to their versatile applicability, electrochemical cells like lithium batteries are often used at elevated temperatures e.g. arising in a car exposed to sunlight. At elevated temperatures decomposition reactions in the electrochemical cell take place faster and the electrochemical properties of the cell degrade faster e.g. shown by accelerated capacity fading and increase of internal resistance of the cell.

JP 2015-097179 A1 describes electrolyte solutions containing a fluorinated carbonate, a metal ion which has an oxidation-reduction potential to lithium of more than 1 V, and at least 70 vol-% of an organic ester of inorganic phosphorous acids like triethyl phosphate and dimethylmethyl phosphonate. The phosphorous esters are added to increase the fire retardancy and the degradation of the electrolyte solution at elevated temperature.

It is the object of the present disclosure to provide an electrolyte composition with good electrochemical properties like long cycle life, storage stability, good rate capability, low increase of the internal resistance, in particular at elevated temperatures This object is achieved by an electrolyte composition containing
(i) at least one aprotic organic solvent;
(ii) at least one conducting salt;
(iii) methylphosphonoyloxymethane; and
(iv) optionally one or more additives.

The problem is further solved by the use of methylphosphonoyloxymethane in electrolyte compositions, and by electrochemical cells comprising such electrolyte compositions.

Electrochemical cells comprising electrolyte compositions containing methylphosphonoyloxymethane show good properties at elevated temperature like good cycling performance, storability and lower increase of resistance.

In the following the disclosure is described in detail.

The electrolyte composition according to the present disclosure contains
(i) at least one aprotic organic solvent;
(ii) at least one conducting salt;
(iii) methylphosphonoyloxymethane; and
(iv) optionally one or more additives.

The electrolyte composition preferably contains at least one aprotic organic solvent as component (i), more preferred at least two aprotic organic solvents (i). According to one implementation the electrolyte composition may contain up to ten aprotic organic solvents.

The at least one aprotic organic solvent (i) is preferably selected from cyclic and acyclic organic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, cyclic and acyclic esters of carboxylic acids, cyclic and acyclic sulfones, and cyclic and acyclic nitriles and dinitriles.

More preferred the at least one aprotic organic solvent (i) is selected from cyclic and acyclic organic carbonates, di-$C_1$-$C_{10}$-alkylethers, di-$C_1$-$C_4$-alkyl-$C_2$-$C_6$-alkylene ethers and polyethers, cyclic and acyclic acetales and ketales, and cyclic and acyclic esters of carboxylic acids, even more preferred the at least one aprotic organic solvent (i) is selected from cyclic and acyclic organic carbonates and cyclic and acyclic esters of carboxylic acids and most preferred the at least one aprotic organic solvent (i) comprises at least one acyclic organic carbonate and at least one cyclic organic carbonate or at least one cyclic acyclic ester of carboxylic acids and at least one acyclic ester of carboxylic acids.

The alkyl ester of carboxylic acids are preferably selected from esters of $C_1$-$C_4$ alcohols with $C_1$-$C_4$ carboxylic acids, for example esters of methanol, ethanol, i-propanol or n-propanol with formic acid, acetic acid or propionic acid like methyl formate, ethyl formate, and n-propyl formate, methyl acetate, ethyl acetate, i- and n-propyl acetate, methyl propionate, ethyl propionate, and i- and n-propyl propionate.

The aprotic organic solvents may be partly halogenated, e.g. they may be partly fluorinated, partly chlorinated or partly brominated, and preferably they may be partly fluorinated. "Partly halogenated" means, that one or more H of the respective molecule is substituted by a halogen atom, e.g. by F, Cl or Br. Preference is given to the substitution by F. The at least one solvent may be selected from partly halogenated and non-halogenated aprotic organic solvents, i.e. the electrolyte composition may contain a mixture of partly halogenated and non-halogenated aprotic organic solvents.

Examples of cyclic organic carbonates are ethylene carbonate (EC), propylene carbonate (PC) and butylene carbonate (BC), wherein one or more H of the alkylene chain may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred cyclic organic carbonates are ethylene carbonate, monofluoroethylene carbonate and propylene carbonate, in particular ethylene carbonate and propylene carbonate.

Examples of acyclic organic carbonates are di-$C_1$-$C_{10}$-alkylcarbonates, wherein each alkyl group is selected independently from each other, preferred are di-$C_1$-$C_4$-alkylcarbonates. Examples are e.g. diethyl carbonate (DEC), ethyl methyl carbonate (EMC), dimethyl carbonate (DMC), and methylpropyl carbonate. Preferred acyclic organic carbonates are diethyl carbonate (DEC), ethyl methyl carbonate (EMC), and dimethyl carbonate (DMC).

According to the disclosure each alkyl group of the di-$C_1$-$C_{10}$-alkylethers is selected independently from the other. Examples of di-$C_1$-$C_{10}$-alkylethers are dimethylether, ethylmethylether, diethylether, methylpropylether, diisopropylether, and di-n-butylether.

Examples of di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable polyethers are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of cyclic ethers are 1,4-dioxane, tetrahydrofuran, and their derivatives like 2-methyl tetrahydrofuran.

Examples of acyclic acetals are 1,1-dimethoxymethane and 1,1-diethoxymethane. Examples of cyclic acetals are 1,3-dioxane, 1,3-dioxolane, and their derivatives such as methyl dioxolane.

Examples of acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane.

Examples of acyclic esters of carboxylic acids are alkyl ester of monocarboxylic acids e.g. esters of $C_1$-$C_4$ alcohols with $C_1$-$C_4$ carboxylic acids, for example esters of methanol, ethanol, i-propanol or n-propanol with formic acid, acetic acid or propionic acid like methyl formiate, ethyl formiate, i- and n-propyl formiate, methyl acetate, ethyl acetate, i- and n-propyl acetate, methyl propionate, ethyl propionate, and i- and n-propyl propionate. Other examples of acyclic esters of carboxylic acids are alkyl ester of dicarboxylic acids like 1,3-dimethyl propanedioate.

Cyclic ester of carboxylic acids are lactones, e.g. γ-butyrolactone and □-caprolactone.

Examples of cyclic and acyclic sulfones are ethyl methyl sulfone, dimethyl sulfone, and tetrahydrothiophene-S,S-dioxide (sulfolane).

Examples of cyclic and acyclic nitriles and dinitriles are adipodinitrile, acetonitrile, propionitrile, and butyronitrile.

The inventive electrolyte composition contains at least one conducting salt (ii). The electrolyte composition functions as a medium that transfers ions participating in the electrochemical reaction taking place in an electrochemical cell. The conducting salt(s) (ii) present in the electrolyte are usually solvated in the aprotic organic solvent(s) (i). Preferably the conducting salt is a lithium salt.

The conducting salt may be selected from the group consisting of $Li[F_{6-x}P(C_yF_{2y+1})_x]$, wherein x is an integer in the range from 0 to 6 and y is an integer in the range from 1 to 20;

$Li[B(R^I)4]$, $Li[B(R^I)2(OR^{II}O)]$ and $Li[B(OR^{II}O)2]$ wherein each $R^I$ is independently from each other selected from F, Cl, Br, I, C1-C4 alkyl, C2-C4 alkenyl, C2-C4 alkynyl, OC1-C4 alkyl, OC2-C4 alkenyl, and OC2-C4 alkynyl wherein alkyl, alkenyl, and alkynyl may be substituted by one or more $OR^{III}$, wherein $R^{III}$ is selected from C1-C6 alkyl, C2-C6 alkenyl, and C2-C6 alkynyl, and $(OR^{II}O)$ is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

$LiClO_4$; $LiAsF_6$; $LiCF_3SO_3$; $Li_2SiF_6$; $LiSbF_6$; $LiAlCl_4$, $Li(N(SO_2F)_2)$, lithium tetrafluoro (oxalato) phosphate; lithium oxalate; and salts of the general formula $Li[Z(C_nF_{2n}F_{2n+1}SO_2)_m]$, where m and n are defined as follows:

m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group $(OR^{II}O)$ is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group $(OR^{II}O)$ is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acids are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group $(OR^{II}O)$ is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B(R$^I$)$_4$], Li[B(R$^I$)$_2$(OT$^{II}$O)] and Li[B(OR$^{II}$O)$_2$] are LiBF$_4$, lithium difluoro oxalato borate and lithium dioxalato borate.

Preferably the at least one conducting salt (ii) is selected from LiPF$_6$, LiAsF$_6$, LiSbF$_6$, LiCF$_3$SO$_3$, LiBF$_4$, lithium bis(oxalato) borate, lithium difluoro(oxalato) borate, LiCl$_4$, LiN(SO$_2$C$_2$F$_5$)$_2$, LiN(SO$_2$CF$_3$)$_2$, LiN(SO$_2$F)$_2$, and LiPF$_3$(CF$_2$CF$_3$)$_3$, more preferred LiPF$_6$, LiBF$_4$, and LiPF$_3$(CF$_2$CF$_3$)$_3$, more preferred the conducting salt is selected from LiPF$_6$ and LiBF$_4$, and the most preferred conducting salt is LiPF$_6$.

The at least one conducting salt is usually present at a minimum concentration of at least 0.1 m/l, preferably the concentration of the at least one conducting salt is 0.5 to 2 mol/l based on the entire electrolyte composition.

The electrolyte composition of the present disclosure contains methylphosphonoyloxymethane as component (iii) which has the chemical formula (I)

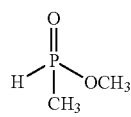

Methylphosphonoyloxymethane has a chiral center but is usually present as mixture of the two enantiomers since it can racemize via its tautomeric forms. Methylphosphonoyloxymethane may be synthesized by reaction of CH$_3$PCl$_2$ with methanol and a basic catalyst like triethylamine.

The concentration of the methylphosphonoyloxymethane in the electrolyte composition according to the present disclosure is usually at least 0.01 wt.-%, preferably the concentration is in the range of 0.01 to 5 wt.-% and more preferred in the range of 0.05 to 1 wt.-%, based on the total weight of the electrolyte composition.

A further object of the present disclosure is the use of methylphosphonoyloxymethane in electrolyte compositions, e.g. as additive. Preferably methylphosphonoyloxymethane is used as film forming additive in electrolyte compositions.

Methylphosphonoyloxymethane is usually used by adding the desired amount to the electrolyte composition. Methylphosphonoyloxymethane is usually used in the electrolyte composition in the concentrations described above and as described as preferred.

The electrolyte composition according to the present disclosure optionally contains at least one further additive (iv). The additive(s) (iv) may be selected from SEI forming additives, flame retardants, overcharge protection additives, wetting agents, HF and/or H$_2$O scavenger, stabilizer for LiPF$_6$ salt, ionic salvation enhancer, corrosion inhibitors, gelling agents, and the like. The one or more additives (iv) are different from methylphosphonoyloxymethane.

Examples of flame retardants are organic phosphorous compounds like cyclophosphazenes, organic phosphoramides, organic phosphites, organic phosphates, organic phosphonates, organic phosphines, and organic phosphinates, and fluorinated derivatives thereof.

Examples of cyclophosphazenes are ethoxypentafluorocyclotriphosphazene, available under the trademark Phoslyte™ E from Nippon Chemical Industrial, hexamethylcyclotriphosphazene, and hexamethoxycyclotriphosphazene, preferred is ethoxypentafluorocyclotriphosphazene. An example of an organic phosphoramide is hexamethyl phosphoramide. An example of an organic phosphite is tris(2,2,2-trifluoroethyl) phospite. Examples of organic phosphates are trimethyl phosphate, trimethyl phosphate, tris(2,2,2-trifluoroethyl)phosphate, bis(2,2,2-trifluoroethyl) methyl phosphate, and triphenyl phosphate Examples of organic phosphonates are dimethyl phosphonate, ethyl methyl phosphonate, methyl n-propyl phosphonate, n-butyl methyl phosphonate, diethyl phosphonate, ethyl n-proply phosphonate, ethyl n-butyl phosphonate, di-n-propyl phosphonate, n-butyl n-propyl phosphonate, di-n-butyl phosphonate, and bis(2,2,2-trifluoroethyl) methyl phosphonate. An example of an organic phosphine is triphenyl phosphine. Examples of organic phosphinates are dimethyl phosphonate, diethyl phosphinate, di-n-propyl phosphinate, trimethyl phosphinate, trimethyl phosphinate, and tri-n-propyl phosphinate.

Examples of HF and/or H$_2$O scavenger are optionally halogenated cyclic and acyclic silylamines.

A SEI forming additive according to the present disclosure is a compound which decomposes on an electrode to form a passivation layer on the electrode which prevents degradation of the electrolyte and/or the electrode. In this way, the lifetime of a battery is significantly extended. The term "SEI" means "solid electrolyte interface". SEI forming additives are also named film forming additives and the two terms are used interchangeably herein. Preferably the SEI forming additive forms a passivation layer on the anode. An anode in the context of the present disclosure is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a lithium-ion containing cathode, for example lithium cobalt oxide, and an electrolyte containing a small amount of said compound, typically from 0.1 to 10 wt.-% of the electrolyte composition, preferably from 0.2 to 5 wt.-% of the electrolyte composition. Upon application of a voltage between anode and cathode, the differential capacity of the electrochemical cell is recorded between 0.5 V and 2 V vs. a Lithium metal reference. If a significant differential capacity is observed during the first cycle, for example −150 mAh/V at 1 V, but not or essentially not during any of the following cycles in said voltage range, the compound can be regarded as SEI forming additive. SEI forming additives per se are known to the person skilled in the art.

Examples of SEI forming additives are cyclic carbonates containing at least one double bond like vinylene carbonate and its derivatives; fluorinated ethylene carbonate and its derivatives such as monofluoroethylene carbonate, cis- and trans-difluorocarbonate; cyclic esters of sulfur containing acids like propane sultone and its derivatives and ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate;

and ionic compounds containing a cation of formula (II)

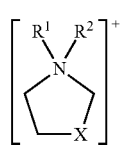

(II)

wherein
X is CH$_2$ or NR$^a$,
R$^1$ is selected from C$_1$ to C$_6$ alkyl,
R$^2$ is selected from —(CH$_2$)$_u$—SO$_3$—(CH$_2$)$_v$—R$^b$,
—SO$_3$— is —O—S(O)$_2$— or —S(O)$_2$—O—, preferably —SO$_3$— is —O—S(O)$_2$—,
u is an integer from 1 to 8, preferably u is 2, 3 or 4, wherein one or more CH$_2$ groups of the =(CH$_2$)$_u$=, alkylene chain which are not directly bound to the N-atom and/or the SO$_3$ group may be replaced by O and wherein two adjacent CH$_2$ groups of the =(CH$_2$)$_u$=, alkylene chain may be replaced by a C—C double bond, preferably the =(CH$_2$)$_u$=, alkylene chain is not substituted and u u is an integer from 1 to 8, preferably u is 2, 3 or 4,
v is an integer from 1 to 4, preferably v is 0,
R$^a$ is selected from C$_1$ to C$_6$ alkyl,
R$^b$ is selected from C$_1$-C$_{20}$ alkyl, C$_2$-C$_{20}$ alkenyl, C$_2$-C$_{20}$ alkynyl, C$_6$-C$_{12}$ aryl, and C$_7$-C$_{24}$ aralkyl, which may contain one or more F, and wherein one or more CH$_2$ groups of alkyl, alkenyl, alkynyl and aralkyl which are not directly bound to the SO$_3$ group may be replaced by O, preferably R$^b$ is selected from C$_1$-C$_6$ alkyl, C$_2$-C$_4$ alkenyl, and C$_2$-C$_4$ alkynyl, which may contain one or more F, and wherein one or more CH$_2$ groups of alkyl, alkenyl, alkynyl and aralkyl which are not directly bound to the SO$_3$ group may be replaced by O, preferred examples of R$^b$ include methyl, ethyl, trifluoromethyl, pentafluoroethyl, n-propyl, n-butyl, n-hexyl, ethenyl, ethynyl, allyl or prop-1-yn-yl,
and an anion selected from bisoxalato borate, difluoro (oxalato) borate, [F$_z$B(C$_m$F$_{2m+1}$)$_{4-z}$]$^-$, [F$_y$P(C$_m$F$_{2m+1}$)$_{6-y}$]$^-$, (C$_m$F$_{2m+1}$)$_2$P(O)O]$^-$, [C$_m$F$_{2m+1}$P(O)O$_2$]$^{2-}$, [O—C(O)—C$_m$F$_{2m+1}$]$^-$, [O—S(O)$_2$—C$_m$F$_{2m+1}$]$^-$, [N(C(O)—C$_m$F$_{2m+1}$)$_2$]$^-$, [N(S(O)$_2$—C$_m$F$_{2m+1}$)$_2$]$^-$, [N(C(O)—C$_m$F$_{2m+1}$)(S(O)$_2$—C$_m$F$_{2m+1}$)]$^-$, [N(C(O)—C$_m$F$_{2m+1}$)(C(O)F)]$^-$, [N(S(O)$_2$—C$_m$F$_{2m+1}$)(S(O)$_2$F)]$^-$, [N(S(O)$_2$F)$_2$]$^-$, [C(C(O)—C$_m$F$_{2m+1}$)$_3$]$^-$, [C(S(O)$_2$—C$_m$F$_{2m+1}$)$_3$]$^-$, wherein m is an integer from 1 to 8, z is an integer from 1 to 4, and y is an integer from 1 to 6,
Preferred anions are bisoxalato borate, difluoro (oxalato) borate, [F$_3$B(CF$_3$)]$^-$, [F$_3$B(C$_2$F$_5$)]$^-$, [PF$_6$]$^-$, [F$_3$P(C$_2$F$_5$)$_3$]$^-$, [F$_3$P(C$_3$F$_7$)$_3$]$^-$, [F$_3$P(C$_4$F$_9$)$_3$]$^-$, [F$_4$P(C$_2$F$_5$)$_2$]$^-$, [F$_4$P(C$_3$F$_7$)$_2$]$^-$, [F$_4$P(C$_4$F$_9$)$_2$]$^-$, [F$_5$P(C$_2$F$_5$)]$^-$, [F$_5$P(C$_3$F$_7$)]$^-$ or [F$_5$P(C$_4$F$_9$)]$^-$, [(C$_2$F$_5$)$_2$P(O)O]$^-$, [(C$_3$F$_7$)$_2$P(O)O]$^-$ or [(C$_4$F$_9$)$_2$P(O)O]$^-$. [C$_2$F$_5$P(O)O$_2$]$^{2-}$, [C$_3$F$_7$P(O)O$_2$]$^{2-}$, [C$_4$F$_9$P(O)O$_2$]$^{2-}$, [O—C(O)CF$_3$]$^-$, [O—C(O)C$_2$F$_5$]$^-$, [O—C(O)C$_4$F$_9$]$^-$, [O—S(O)$_2$CF$_3$]$^-$, [O—S(O)$_2$C$_2$F$_5$]$^-$, [N(C(O)C$_2$F$_5$)$_2$]$^-$, [N(C(O)(CF$_3$)$_2$]$^-$, [N(S(O)$_2$CF$_3$)$_2$]$^-$, [N(S(O)$_2$C$_2$F$_5$)$_2$]$^-$, [N(S(O)$_2$C$_3$F$_7$)$_2$]$^-$, [N(S(O)$_2$CF$_3$)(S(O)$_2$C$_2$F$_5$)]$^-$, [N(S(O)$_2$C$_4$F$_9$)$_2$]$^-$, [N(C(O)CF$_3$)(S(O)$_2$CF$_3$)]$^-$, [N(C(O)C$_2$F$_5$)(S(O)$_2$CF$_3$)]$^-$ or [N(C(O)CF$_3$)(S(O)$_2$—C$_4$F$_9$)]$^-$, [N(C(O)CF$_3$)(C(O)F)]$^-$, [N(C(O)C$_2$F$_5$)(C(O)F)]$^-$, [N(C(O)C$_3$F$_7$)(C(O)F)]$^-$, [N(S(O)$_2$CF$_3$)(S(O)$_2$F)]$^-$, [N(S(O)$_2$C$_2$F$_5$)(S(O)$_2$F)]$^-$, [N(S(O)$_2$C$_4$F$_9$)(S(O)$_2$F)]$^-$, [C(C(O)CF$_3$)$_3$]$^-$, [C(C(O)C$_2$F$_5$)$_3$]$^-$ or [C(C(O)C$_3$F$_7$)$_3$]$^-$, [C(S(O)$_2$CF$_3$)$_3$]$^-$, [C(S(O)$_2$C$_2$F$_5$)$_3$]$^-$, and [C(S(O)$_2$C$_4$F$_9$)$_3$]$^-$.

More preferred the anion is selected from bisoxalato borate, difluoro (oxalato) borate, CF$_3$SO$_3^-$, and [PF$_3$(C$_2$F$_5$)$_3$]$^-$.

The term "C$_2$-C$_{20}$ alkenyl" as used herein refers to an unsaturated straight or branched hydrocarbon group with 2 to 20 carbon atoms having one free valence. Unsaturated means that the alkenyl group contains at least one C—C double bond. C$_2$-C$_6$ alkenyl includes for example ethenyl, 1-propenyl, 2-propenyl, 1-n-butenyl, 2-n-butenyl, iso-butenyl, 1-pentenyl, 1-hexenyl, 1-heptenyl, 1-octenyl, 1-nonenyl, 1-decenyl and the like. Preferred are C$_2$-C$_{10}$ alkenyl groups, more preferred are C$_2$-C$_6$ alkenyl groups, even more preferred are C$_2$-C$_4$ alkenyl groups and in particular ethenyl and 1-propen-3-yl (allyl).

The term "C$_2$-C$_{20}$ alkynyl" as used herein refers to an unsaturated straight or branched hydrocarbon group with 2 to 20 carbon atoms having one free valence, wherein the hydrocarbon group contains at least one C—C triple bond. C$_2$-C$_6$ alkynyl includes for example ethynyl, 1-propynyl, 2-propynyl, 1-n-butinyl, 2-n-butynyl, iso-butinyl, 1-pentynyl, 1-hexynyl, -heptynyl, 1-octynyl, 1-nonynyl, 1-decynyl and the like and the like. Preferred are C$_2$-C$_{10}$ alkynyl, more preferred are C$_2$-C$_6$ alkynyl, even more preferred are C$_2$-C$_4$ alkynyl, in particular preferred are ethynyl and 1-propyn-3-yl (propargyl).

The term "C$_6$-C$_{12}$ aryl" as used herein denotes an aromatic 6- to 12-membered hydrocarbon cycle or condensed cycles having one free valence. Examples of C$_6$-C$_{12}$ aryl are phenyl and naphtyl. Preferred is phenyl.

The term "C$_7$-C$_{24}$ aralkyl" as used herein denotes an aromatic 6- to 12-membered aromatic hydrocarbon cycle or condensed aromatic cycles substituted by one or more C$_1$-C$_6$ alkyl. The C$_7$-C$_{24}$ aralkyl group contains in total 7 to 24 C-atoms and has one free valence. The free valence may be located at the aromatic cycle or at a C$_1$-C$_6$ alkyl group, i.e. C$_7$-C$_{24}$ aralkyl group may be bound via the aromatic part or via the alkyl part of the aralkyl group. Examples of C$_7$-C$_{24}$ aralkyl are methylphenyl, benzyl, 1,2-dimethylphenyl, 1,3-dimethylphenyl, 1,4-dimethylphenyl, ethylphenyl, 2-propylphenyl, and the like.

Compounds of formula (II) and their preparation are described in detail in WO 2013/026854 A1. Examples of compounds of formula (II) which are preferred according to the present disclosure are disclosed on page 12, line 21 to page 15, line 13 of WO 2013/026854 A1.

The cyclic carbonates containing at least one double bond include cyclic carbonates wherein a double bond is part of the cycle like vinylene carbonate and its derivatives, e.g. methyl vinylene carbonate and 4,5-dimethyl vinylene carbonate; and cyclic carbonate wherein the double bond is not part of the cycle, e.g. methylene ethylene carbonate, 4,5-dimethylene ethylene carbonate, vinyl ethylene carbonate, and 4,5-divinyl ethylene carbonate. Preferred cyclic carbonates containing at least one double bond are vinylene carbonate, methylene ethylene carbonate, 4,5-dimethylene ethylene carbonate, vinyl ethylene carbonate, and 4,5-divinyl ethylene carbonate, most preferred is vinylene carbonate.

Examples of cyclic esters of sulfur containing acids include cyclic esters of sulfonic acid like propane sultone and its derivatives, methylene methane disulfonate and its derivatives, and propene sultone and its derivatives; and cyclic esters derived from sulfurous acid like ethylene sulfite and its derivatives. Preferred cyclic esters of sulfur containing acids are propane sultone, propene sultone, methylene methane disulfonate, and ethylene sulfite.

Preferred SEI-forming additives are oxalato borates, fluorinated ethylene carbonate and its derivatives, cyclic carbonates containing at least one double bond, and cyclic esters of sulfur containing acids, and compounds of formula (II). More preferred the electrolyte composition contains at least one additive selected from cyclic carbonates containing at least one double bond and cyclic esters of sulfur containing acids. The electrolyte composition may contain at least one additive selected from cyclic carbonates containing at least one double bond and cyclic esters of sulfur containing acids or at least one additive selected from cyclic carbonates containing at least one double bond and at least one additive selected from cyclic esters of sulfur containing acids. If the electrolyte composition contains a SEI forming additive (iv) it is usually present in a concentration of from 0.1 to 10 wt.-%, preferably of from 0.2 to 5 wt.-% of the electrolyte composition.

Examples of overcharge protection additives are compounds of formula (III)

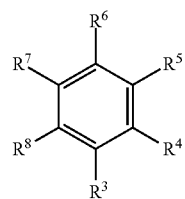

$R^3$ is cyclohexyl or $C_6$-$C_{12}$ aryl, which may be substituted by one or more substituent selected independently from each other from F, Cl, Br, I, $C_6$-$C_{12}$ aryl, and $C_1$-$C_6$ alkyl, wherein $C_6$-$C_{12}$ aryl and $C_1$-$C_6$ alkyl may be substituted by one or more substituent selected independently from each other from F, Cl, Br and I; and $R^4$, $R^5$, $R^6$, $R^7$, and $R^8$ may be same or different and are independently from each other selected from H, F, Cl, Br, I, $C_6$-$C_{12}$ aryl, and $C_1$-$C_6$ alkyl, wherein $C_6$-$C_{12}$ aryl and $C_1$-$C_6$ alkyl may be substituted by one or more substituent selected independently from each other from F, Cl, Br and I.

Examples of compounds of formula (III) are cyclohexylbenzene, biphenyl, o-terphenyl and p-terphenyl, preferred compounds of formula (III) are cyclohexylbenzene and biphenyl.

Examples of gelling agents are polymers like polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. These polymers are added to the electrolytes in order to convert liquid electrolytes into quasi-solid or solid electrolytes and thus to improve solvent retention, especially during ageing.

A compound added as additive (iv) may have more than one effect in the electrolyte composition and the device comprising the electrolyte composition. E.g. lithium oxalato borate may be added as additive enhancing the SEI formation but it may also be added as conducting salt.

According to one implementation of the present disclosure the electrolyte composition contains at least one additive (iv). Preferably the electrolyte composition contains at least one additive (iv) selected from film forming additives, flame retardants, overcharging additives, wetting agents, HF and/or $H_2O$ scavenger, stabilizer for $LiPF_6$ salt, ionic salvation enhancer, corrosion inhibitors, and gelling agents, more preferred the electrolyte composition contains at least one flame retardant additive, even more preferred the electrolyte composition contains at least one flame retardant additive selected from cyclophosphazenes, organic phosphoramides, organic phosphites, organic phosphonates, organic phosphines, and organic phosphinates, in particular preferred the electrolyte composition contains a cyclophosphazene.

In case the electrolyte composition contains one or more flame retardant additives, the electrolyte composition contains preferably in total 1 to 10 wt.-% of the one or more flame retardant additives, more preferred 2 to 5 wt.-% of the one or more flame retardant additives, based on the total weight of the electrolyte composition.

A preferred electrolyte composition contains
(i) at least 74.99 wt.-% of at least one organic aprotic solvent;
(ii) 0.1 to 25 wt.-% of at least one conducting salt;
(iii) 0.01 to 5 wt.-% methylphosphonoyloxymethane; and
(iv) 0 to 25 wt.-% of at least one additive,
based on the total weight of the electrolyte composition.

The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The content of HF of the inventive electrolyte composition is preferably below 60 ppm, based on the weight of the electrolyte composition, more preferred below 40 ppm, most preferred below 20 ppm. The HF content may be determined by titration according to potentiometric or potentiographic titration method.

The inventive electrolyte composition is preferably liquid at working conditions; more preferred it is liquid at 1 bar and 25° C., even more preferred the electrolyte composition is liquid at 1 bar and −10° C., in particular the electrolyte composition is liquid at 1 bar and −25° C., even more preferred the electrolyte composition is liquid at 1 bar and −35° C.

The electrolyte compositions of the disclosure are prepared by methods which are known to the person skilled in the field of the production of electrolytes, generally by dissolving the conductive salt (ii) in the corresponding mixture of solvent(s) (i) and adding methylphosphonoyloxymethane (iii) and optionally additives (iv), as described above.

The electrolyte compositions may be used in electrochemical cells, preferred they are used in a lithium battery, a double layer capacitor, or a lithium ion capacitor, more preferred they are used in lithium batteries, even more preferred in secondary lithium cells and most preferred in secondary lithium ion batteries.

The disclosure further provides an electrochemical cell comprising the electrolyte composition as described above or as described as being preferred.

The general construction of such electrochemical cell is known and is familiar to the person skilled in this art—for batteries, for example, in Linden's Handbook of Batteries (ISBN 978-0-07-162421-3).

The electrochemical cell may be a lithium battery, a double layer capacitor, or a lithium ion capacitor.

Preferably the electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds; e.g. the lithium battery may be a lithium ion battery, a lithium/sulphur battery, or a lithium/selenium sulphur battery.

In particular preferred the electrochemical device is a lithium ion battery, i.e. a secondary lithium ion electrochemical cell comprising a cathode comprising a cathode active material that can reversibly occlude and release lithium ions and an anode comprising an anode active material that can reversibly occlude and release lithium ions. The terms "secondary lithium ion electrochemical cell" and "(secondary) lithium ion battery" are used interchangeably within the present disclosure.

The at least one cathode active material preferably comprises a material capable of occluding and releasing lithium ions selected from lithiated transition metal phosphates and lithium ion intercalating metal oxides.

Examples of lithiated transition metal phosphates are $LiFePO_4$ and $LiCoPO_4$, examples of lithium ion intercalating metal oxides are $LiCoO_2$, $LiNiO_2$, $LiMnO_2$, mixed transition metal oxides with layer structure having the general formula $Li_{(1+z)}[Ni_aCo_bMn_c]_{(1-z)}O_{2+e}$ wherein z is 0 to 0.3; a, b and c may be same or different and are independently 0 to 0.8 wherein a+b+c=1; and $-0.1 \le e \le 0.1$, and manganese-containing spinels like $LiMnO_4$ and spinels of general formula $Li_{1+t}M_{2-t}O_{4-d}$ wherein d is 0 to 0.4, t is 0 to 0.4 and M is Mn and at least one further metal selected from the group consisting of Co and Ni, and $Li_{(1+g)}[Ni_h Co_iA_j]_{(1-g)}O_{2+k}$. Typical values for g, h, I, j and k are: g=0, h=0.8 to 0.85, i=0.15 to 0.20, j=0.02 to 0.03 and k=0.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

The anode comprised within the lithium batteries of the present disclosure comprises an anode active material that can reversibly occlude and release lithium ions or is capable to form an alloy with lithium. For example, carbonaceous material that can reversibly occlude and release lithium ions can be used as anode active material. Carbonaceous materials suited are crystalline carbon materials such as graphite materials like natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber. Some carbonaceous materials usable as anode active materials are prone to deterioration by propylene carbonate if propylene carbonate is present in the electrolyte composition. This deterioration is usually caused by intercalation of propylene carbonate molecules into the carbonaceous material during electrochemical cycling of the cell. The intercalation of the propylene molecules leads to exfoliation of layers of the carbonaceous material. For instance graphite materials are very easily destroyed by exfoliation due to intercalation of propylene carbonate. Usually carbonaceous materials comprising at least partially graphitic layers are prone to such deterioration caused by propylene carbonate present in the electrolyte composition during cycling. In order to determine whether a carbonaceous material is prone to deterioration by propylene carbonate the procedure described below may be followed:

To determine if a carbonaceous material is sensitive to deterioration caused by propylene carbonate coin button cells can be built similar to the procedure described below in the experimental section. Instead of the graphite electrode as described in the procedure the carbonaceous material based electrode is used as negative electrode. As electrolyte a solution of 1 M $LiPF_6$ in PC:DMC (1:1 by wt.) has to be used. Carbonaceous materials that are sensitive to deterioration by propylene carbonate show a strong capacity fading and have a capacity retention after 20 cycles that is below 25% based on the theoretical capacity of the cell.

The addition of methylphosphonoyloxymethane effectively prevents deterioration of carbonaceous anode active material by propylene carbonate. According to one implementation of the disclosure the anode active material is selected from carbonaceous materials prone to deterioration by propylene carbonate. Preferably the anode active material is selected from carbonaceous materials comprising at least partially graphitic layers, more preferred the anode active material is selected from graphite materials.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, tin (Sn), lead (Pb), aluminum (Al), indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material are silicon based materials. Silicon based materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector.

Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material is selected from carbonaceous material that can reversibly occlude and release lithium ions, particularly preferred the carbonaceous material that can reversibly occlude and release lithium ions is selected from carbonaceous materials prone to deterioration by propylene carbonate, in particular preferred are graphite materials. In another preferred implementation the anode active is selected from silicon based materials that can reversibly occlude and release lithium ions, preferably the anode comprises a thin film of silicon or a silicon/carbon composite. In a further preferred implementation the anode active is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium batteries may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive lithium batteries may be combined with one another, for example in series connection or in parallel connection. Series connection is preferred. The present disclosure further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive lithium ion batteries can also be used for stationary energy stores.

Even without further statements, it is assumed that a skilled person is able to utilize the above description in its widest extent. Consequently, the preferred implementations and examples are to be interpreted merely as a descriptive enclosure which in no way has any limiting effect at all.

The disclosure is illustrated by the examples which follow, which do not, however, restrict the disclosure.

1. ELECTROLYTE COMPOSITIONS

Electrolyte compositions were prepared from methylphosphonoyloxymethane (MPOM), ethylene carbonate (EC), dimethyl carbonate (DMC), ethyl methyl carbonate (EMC), lithium hexafluorophosphate ($LiPF_6$), and vinylene carbonate (VC). The exact compositions are shown in Tables 1 and 2. Wt.-% are based on the total weight of the electrolyte composition.

MPOM was prepared according to the following procedure. To a cold solution (0° C.) of $CH_3PC_{12}$ (1.0 eq, 390 mmol, 50.66 g) in tetrahydrofurane (THF) (abs., 200 mL) was carefully added a dry mixture of methanol (2.5 eq., 980 mmol, 31.24 g) and triethylamine (1.02 eq., 400 mmol, 40.66 g) in THF (abs., 100 mL) and the reaction temperature was kept between 0° C. and 5° C. After complete addition, the reaction mixture was heated to 50° C. for 60 min, cooled to room temperature and the formed precipitate was filtered off. The filtrate was concentrated and distilled (2 mbar, 46° C.) to obtain MPOP as a colorless oil (25.8 g, 270 mmol, 70% yield).

2. ELECTROCHEMICAL TESTS

Electrochemical Performance

Differential Capacity:

Button cells were fabricated using lithium nickel cobalt manganese oxide ($Li(Ni_{0.33}Co_{0.33}Mn_{0.33})O_2$, NCM 111) electrodes with a capacity of 2 $mAh/cm^2$ and a graphite electrode with a capacity of 2.15 $mAh/cm^2$. A glass-fiber filter separator (Whatmann GF/D) was used as separator, which was soaked with 100 µl of the respective electrolyte composition. The cells were charged with a rate of C/5. The differential capacity plot was measured at 25° C. in climate chambers. The reaction potential of the additive was determined by an increase of differential capacity (mAh/V) within a voltage range of 2.5 V to 3.1 V above a value of 0.5 mAh/V. The additive Methylphosphonoyloxymethane shows its decomposition reaction already at 2.65V. The decomposition leads to a passivation of the graphite electrode and the typical reaction of VC at 2.9V is not observed. The results are shown in Table 1.

TABLE 1

| | Differential capacity | |
|---|---|---|
| | Electrolyte composition | Reaction onset in V |
| Example 1: | 1M $LiPF_6$ in EC:EMC 1:1 by wt. + 2 wt.-% VC + 5 wt.-% MPOM | 2.65 |
| Comparative example 1: | 1M $LiPF_6$ in EC:EMC 1:1 by wt. + 2 wt.-% VC | 2.92 |

Battery Test

Pouch cells (220 mAh) were fabricated using lithium nickel cobalt manganese oxide ($Li(Ni_{0.6}Co_{0.2}Mn_{0.2})O_2$, NCM 622), electrode density 3.4 g/ccm, mass loading 17 $mg/cm^2$) with graphite anodes (artificial graphite, electrode density 1.4 g/ccm, mass loading 10 $mg/cm^2$) using a 12 µm thick polyolefin separator. The cell was filled with 700 µl of electrolyte stored for 6 h and then evacuated and sealed. The formation of the cells was done by charging at a charge rate of 0.2 C and the storing the cells in a fully charged condition for 5 days at 45° C. After the formation first the capacity of the cells was checked by a 0.2 C charge and discharge step followed by a discharge rate test at 1 C charge and discharge rates of 1 C, 2 C and 3 C. After this the cells were either stored at 60° C. for 20 days in a fully charged state (4.2 V) or cycled at 45° C. at 1 C charge and discharge rate (4.2 V cut-off) for 100 cycles. The resistance of the cells was measured before cycling and storage and afterwards by applying 1 C, 2 C and a 3 C pulse (at 3.6 V) and measuring the voltage drop. The results are summarized in Table 2.

TABLE 2

|  | Electrolyte composition | Capacity recovery after 20 days of storage at 60° C. (*) | DC resistance increase after 20 days of storage at 60° C. | Capacity recovery after 100 cycles at 45° C. (**) | DC resistance increase after 100 cycles at 45° C. |
|---|---|---|---|---|---|
| Example 2 | 1.15M $LiPF_6$ in EC:EMC:DEC 3:1:6 by volume + 0.1 wt % MPOM | 92.4% | 1% | 89% | 92% |
| Example 3 | 1.15M $LiPF_6$ in EC:EMC:DEC 3:1:6 by volume + 0.1 wt % MPOM + 1.5 wt.-% VC | 97.2% | 0% | 94% | 67% |
| Comparative example 2 | 1.15M $LiPF_6$ in EC:EMC:DEC 3:1:6 by volume + 1.5 wt % VC | 94.2% | 36% | 84% | 116% |

(*): Capacity recovery is based on the C/5 discharge capacity after storage compared to the initial C/5 discharge capacity
(**): Capacity recovery is based on the C/5 discharge capacity after 100 cycles compared to the initial C/5 discharge capacity

The invention claimed is:

1. An electrolyte composition comprising:
   at least one aprotic organic solvent;
   at least one conducting salt; and
   methylphosphonoyloxymethane.

2. The electrolyte composition of claim 1, wherein the electrolyte composition comprises 0.01 to 5 wt.-% methylphosphonoyloxymethane based on a total weight of the electrolyte composition.

3. The electrolyte composition of claim 1, wherein the electrolyte composition comprises 0.05 to 1 wt.-% methylphosphonoyloxymethane based on a total weight of the electrolyte composition.

4. The electrolyte composition of claim 1, wherein the at least one aprotic organic solvent is selected from cyclic and acyclic organic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetals and ketals, orthocarboxylic acids esters, cyclic and acyclic esters of carboxylic acids, cyclic and acyclic sulfones, and cyclic and acyclic nitriles and dinitriles.

5. The electrolyte composition of claim 1, wherein the at least one aprotic organic solvent is selected from cyclic and acyclic organic carbonates and cyclic and acyclic esters of carboxylic acids.

6. The electrolyte composition according claim 1, wherein the at least one conducting salt is selected from lithium salts.

7. The electrolyte composition of claim 1, wherein at least one conducting salt is selected from $LiPF_6$, $LiAsF_6$, $LiSbF_6$, $LiCF_3SO_3$, $LiBF_4$, lithium bis(oxalato) borate, lithium difluoro(oxalato) borate, $LiClO_4$, $LiN(SO_2C_2F_5)_2$, $LiN(SO_2CF_3)_2$, $LiN(SO_2F)_2$, and $LiPF_3(CF_2CF_3)_3$.

8. The electrolyte composition of claim 1, wherein the electrolyte composition further comprises at least one additive.

9. The electrolyte composition of claim 8, wherein the at least one additive is selected from cyclic carbonates comprising at least one double bond, and cyclic esters of sulfur comprising acids.

10. The electrolyte composition of claim 9, wherein the electrolyte composition comprises
    at least 74.99 wt.-% of the at least one organic aprotic solvent;
    0.1 to 25 wt.-% of the at least one conducting salt;
    0.01 to 5 wt.-% the methylphosphonoyloxymethane; and
    0 to 25 wt.-% of the at least one additive,
    based on a total weight of the electrolyte composition.

11. Use of methylphosphonoyloxymethane in an electrolyte composition for electrochemical cells.

12. An electrochemical cell comprising an electrolyte composition wherein the electrolyte composition comprises:
    at least one aprotic organic solvent;
    at least one conducting salt; and
    methylphosphonoyloxymethane.

13. The electrochemical cell of claim 12, wherein the electrochemical cell is a lithium battery, a double layer capacitor, or a lithium ion capacitor.

14. The electrochemical cell of claim 12, wherein the electrochemical cell is a lithium cell comprising an anode including an anode active material selected from carbonaceous materials, lithium ion intercalating oxides of Ti, and/or silicon based materials.

15. The electrochemical cell of claim 12, wherein the electrochemical cell comprises a cathode including at least one cathode active material selected from lithium intercalating transition metal oxides and lithiated transition metal phosphates.

* * * * *